United States Patent
Busschbach

(10) Patent No.: US 11,140,067 B2
(45) Date of Patent: Oct. 5, 2021

(54) DISCOVERING CROSS-DOMAIN LINKS BASED ON TRAFFIC FLOW

(71) Applicant: NOKIA SOLUTIONS AND NETWORKS OY, Espoo (FI)

(72) Inventor: Peter Busschbach, Basking Ridge, NJ (US)

(73) Assignee: Nokia Solutions and Networks Oy

( * ) Notice: Subject to any disclaimer, the term of this patent is extended or adjusted under 35 U.S.C. 154(b) by 279 days.

(21) Appl. No.: 16/502,678

(22) Filed: Jul. 3, 2019

(65) Prior Publication Data
US 2021/0006487 A1    Jan. 7, 2021

(51) Int. Cl.
| | |
|---|---|
| *H04L 12/715* | (2013.01) |
| *H04Q 11/00* | (2006.01) |
| *H04L 12/851* | (2013.01) |
| *H04L 12/26* | (2006.01) |
| *H04L 12/751* | (2013.01) |

(52) U.S. Cl.
CPC ........... *H04L 45/04* (2013.01); *H04L 43/103* (2013.01); *H04L 45/02* (2013.01); *H04L 47/2483* (2013.01); *H04Q 11/0066* (2013.01); *H04Q 2011/0073* (2013.01)

(58) Field of Classification Search
CPC ... H04L 45/04; H04L 47/2483; H04L 43/103; H04L 45/02; H04L 45/121; H04L 43/0876; H04L 41/12; H04Q 11/0066; H04Q 2011/0073
See application file for complete search history.

(56) References Cited

U.S. PATENT DOCUMENTS

| | | | |
|---|---|---|---|
| 2014/0270764 A1* | 9/2014 | DeCusatis | H04J 14/0272 398/46 |
| 2017/0331574 A1* | 11/2017 | Tang | H04J 3/0638 |
| 2018/0302152 A1* | 10/2018 | Shikhmanter | H04Q 11/0066 |
| 2018/0309685 A1* | 10/2018 | Srinivasan | H04L 45/04 |

\* cited by examiner

*Primary Examiner* — Nicholas R Taylor
*Assistant Examiner* — Tania M Pena-Santana
(74) *Attorney, Agent, or Firm* — Kramer Amado

(57) ABSTRACT

A method for discovering a cross-domain link between ports in a network implements different compensation algorithms based on differences in the intervals used to obtain traffic flow information at the ports. A first compensation algorithm discovers the cross-domain link when the intervals have different sizes. A second compensation algorithm discovers the cross-domain link when the intervals are misaligned. The algorithms may be implemented by a cross-domain coordinator which recites count information from network devices that include the ports.

18 Claims, 11 Drawing Sheets

DISCOVERING CROSS-DOMAIN LINKS BASED ON TRAFFIC FLOW

TECHNICAL FIELD

This disclosure relates generally to communications management, and more specifically, but not exclusively, to a system and method for discovering a cross-domain link in a data network.

BACKGROUND

Operators need up-to-date network inventory information is order to securely and efficiently run their networks. Connections between routers can be automatically detected and verified using the Link Layer Discovery Protocol (LLDP). However, if a router is connected to an optical device, discovery of the links between router ports and optical ports (e.g., cross-domain links (CDLs)) may be difficult to reliably determine. As a consequence, operators resort to manual or other inefficient methods to obtain network inventory information. Over time, this information tends to become outdated and changes are not always recorded correctly, e.g., typically more than 10% of the information collected using manual inventory methods is inaccurate.

SUMMARY

A brief summary of various example embodiments is presented. Some simplifications and omissions may be made in the following summary, which is intended to highlight and introduce some aspects of the various example embodiments, but not to limit the scope of the invention.

Detailed descriptions of example embodiments adequate to allow those of ordinary skill in the art to make and use the inventive concepts will follow in later sections.

Various embodiments relate to a method for managing information in a network, the method including obtaining a first count value over a period at a first port; obtaining a second count value over the period at a second port; generating a first difference value based on the first and second count values; comparing the first difference value to a first reference value for the period; and determining a cross-domain link between the first and second ports based on the first difference value, wherein the first count value is based on a sum of packets counted at the first port during first intervals and the second count value is based on a sum of packets counted at the second port during second intervals and wherein the second intervals are misaligned relative to the first intervals in the period.

The sum of packets counted at the first port may correspond to packets transmitted at the first port and the sum of packets counted at the second port may correspond to packets received at the second port. The first intervals may partially overlap the second intervals within the period. Each of the intervals may include a first window and a second window, and the second intervals may be shifted relative to the second intervals by the first window or the second window. The first reference value may be based on a difference between a maximum number of counted packets for the first intervals and a minimum number of counted packets over the second intervals, or a difference between a maximum number of counted packets for the second intervals and a minimum number of counted packets over the first intervals.

The method may include obtaining a third count value corresponding to a sum of packets counted at the first port over third intervals of the period, the third intervals shifted relative to the first intervals, generating a second difference value based on the second and third count values, and selecting the first difference value over the second difference value. The third intervals may be shifted by one interval relative to the first intervals. The first difference value may be smaller than the second difference value. The first port may be a router port and the second port may be of optical equipment.

Various other embodiments relate to a method for managing information in a network, the method comprising obtaining count values at a first port over a plurality of first intervals; obtaining count values at a second port over a plurality of second intervals; generating difference values based on the count values at the first and second ports; generating an indicator value based on the difference values; and determining a cross-domain link between the first port and the second port based on the indicator value, wherein the first to fourth count values correspond counted packets and wherein the first intervals and the second intervals have different sizes and are included in a same period.

The count values at the first port may include a first count value for packets transmitted at the first port and a second count value for packets received at the first port, and the count values at the second port may include a third count value for packets received at the second port and a fourth count value for packets transmitted at the first port. The difference values may include first difference values generated based on the first and third count values and second difference values generated based on the second and fourth count values.

The method may include generating a plurality of functional values based on the first and second difference values, wherein the indicator value is generated based on the plurality of functional values. The method may include comparing the indicator value to at least one predetermined threshold, wherein the cross-domain link is determined based on a result of the comparison. The first port may be a router port and the second port may be a port of optical equipment. The method may include obtaining the first to fourth count values based on periodic polling of network devices respectively including the first and second ports. Each of the plurality of first intervals and the plurality of second intervals may be 6 or more.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate example embodiments of concepts found in the claims and explain various principles and advantages of those embodiments.

These and other more detailed and specific features are more fully disclosed in the following specification, reference being had to the accompanying drawings, in which.

DETAILED DESCRIPTION

Figure 1:
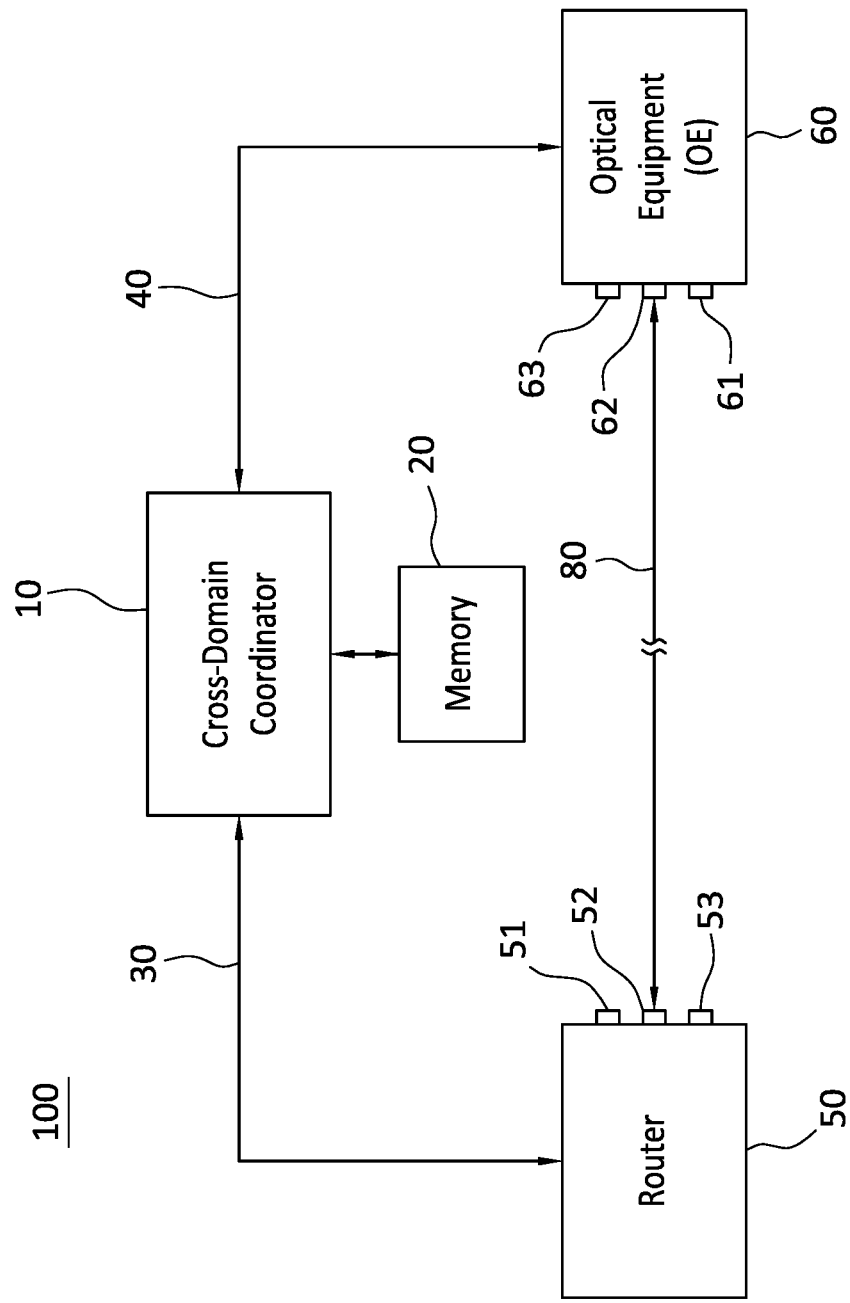
FIG. 1 illustrates an embodiment of a cross-domain coordinator.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

Various methods have been used in an attempt to obtain inventory information in a network. These methods have proven especially unreliable when applied to a network that connects router ports to optical ports. For example, existing methods have been unable to accurately determine traffic counts at ports coupled to opposing sides of cross-domain links. This may be attributed to a variety of reasons, not the least of which includes the presence of misalignment in measurement intervals at the router port and the optical port sides of the link. This misalignment produces a disparity in the counts at these ports, which, in turn, prevents discovery of cross-domain links (CDLs) in the network. As a result, network operators have resorted to manual or other inefficient methods that fail to discover CDLs with sufficient accuracy.

Embodiments described herein provide a system and method for accurately determining cross-domain links between router ports and the ports of an optical data network. The cross-domain links may be discovered in a non-intrusive manner, by compensating for any disparity or misalignment in traffic (e.g., packet) counts at router and optical ports. In one embodiment, a decision criterion is used that enables a controller to determine whether distinct sequences of traffic counts are related to the same traffic flow. This leads to a determination that a router port and a particular optical port are connected at opposing sides of the same link. When such a case exists, the router and optical ports may be said to be matched.

FIG. 1 illustrates an embodiment of a system 100 for determining cross-domain links (CDLs) in a network. The system includes a cross-domain coordinator 10, a memory 20, a first signal path 30 coupled between the cross-domain coordinator 10 and a router 50, and a second signal path 40 coupled between the cross-domain coordinator 10 and optical equipment (OE) 60. The router and optical equipment may exchange information over a cross-domain link 80, which may be bidirectional in at least one embodiment. The cross-domain link 80 may include, for example, an Ethernet link or another type of link. The cross-domain coordinator 10 may include, for example, a software-defined networking (SDN) controller or other software or processing logic for managing the flow of traffic in a network. In one embodiment, the first signal path 30 may be a direct interface. In another embodiment, information (e.g., counts) from the router may be collected through another system before being forwarded to the cross-domain coordinator 10. This collection processed may be based on manual control or programming.

The memory 20 stores one or more algorithms implemented by the cross-domain coordinator 10 to discover the cross-domain link 80 between a particular port of the router 50 and a particular port of the optical equipment 60. In FIG. 1, each of the router 50 and the optical equipment 60 are illustrated to include multiple ports, e.g., router includes ports 51, 52, and 53, and optical equipment 60 includes ports 61, 62, and 63. The router and optical equipment may have a different number of ports in another embodiment. For convenience, the cross-domain link 80 is shown to connect port 52 of the router to port 62 of the optical equipment, but the link may connect any port of the router to any port of the optical equipment. Also, in one embodiment, one or more intervening network devices may be connected between the ports, although for convenience no such devices are shown in the example embodiment of FIG. 1.

The algorithm(s) stored in memory 20 determine cross-domain links based on traffic data measured by the router 50 and optical equipment 60. The traffic data may be measured, for example, by sensors (or other internal circuits or software) that count the number of packets flowing into and out of the ports of the router and optical equipment. In another embodiment, the traffic data may be measured in bytes or other types of data segments or containers. In some embodiments, packets may be counted to prevent having to determine whether ethernet headers are included in the count, which may be the case if bytes are counted. (In some cases, a router may count bytes associated with IP packets only, while the optical equipment may count bytes that include both IP packet and Ethernet headers.)

Information indicative of the counts are transmitted from the router and optical equipment to the cross-domain coordinator 10 through respective ones of signal paths 30 and 40. The algorithm(s) stored in memory 20 are then implemented to discover the cross-domain link. In one embodiment, the cross-domain coordinator may perform an optimization approach which involves implementing multiple algorithms and then selecting the results from one of the algorithms to identify the cross-domain link. In another embodiment, the final decision for identifying a cross-domain link may be based on a combination of results. The cross-domain coordinator 10 may control the receipt of packet counts from the router and optical equipment using various methods. One method involves the cross-domain coordinator 10 reading the packet counts from the router and optical equipment at periodic intervals. The reading interval may be determined, for example, based on the anticipated traffic flow expected on the network. In one embodiment, the interval may be determined based on the processing power of the device and the management system.

In one example, the cross-domain coordinator (e.g., SDN controller) 10 may send a request signal to the router and optical equipment and receive back packet count information in response. The count information may indicate the number of packets counted on a port-by-port basis over the last interval. As an example, the cross-domain coordinator 10 may read packet counts in consecutive 15-minute intervals, with interval 1 corresponding to the time between 8:00 and 8:15, interval 2 corresponding to the time between 8:15 and 8:30, and so on. A different interval of time may be used in another embodiment. (In one embodiment, the management system may poll the device and the device provide a total number of packets sent over its lifetime (e.g., like an odometer reading in a car). In this case, the management system may then determine the packets sent or received over the last interval by subtracting the latest count from the previous count.) The periodic polling method may be referred to as Method A.

When using Method A to retrieve packet or byte counts (e.g., traffic flow counts), it may be possible to miss a readout. In that case, for that interval, the reported count may be set to zero. The next cumulative value may then suddenly be much higher. In this case, the system may record a value that combines the count of previous two intervals. For example, if the normal count is 4, 3, 5, 3, 4, a missed readout would result in 4, 3, 0, 8, 4. If the management system receives packet count sequences with zeroes, those measurements may be ignored or the original values may be approximated, for example, by splitting the value that follows the zero count in two, i.e. 4, 3, 4, 4, 4.

Another method for controlling the receipt of packet counts from the router and optical equipment is based on an accounting policy. The accounting policy is programmed into the router and optical equipment to control the transmission of packet count information to the network management automatically, e.g., without having to receive a request from the cross-domain coordinator. In one embodiment, the accounting policy may control the router and optical equipment to count packets flowing through their ports at predetermined intervals. The packet counts may be stored, for example, in respective local files and then autonomously transmitted to the cross-domain coordinator 10 over respective ones of the signal paths 30 and 40. In another embodiment, the accounting policy may be event-driven instead of time driven, e.g., the router and optical equipment may transmit packet count information based on the occurrence of one or more network or other events. The accounting policy method may be referred to as Method B.

The cross-domain coordinator 10 may identify a cross-domain link between a port of the router and a port of the optical equipment based on the packet count information. In an ideal case, irrespective of which method A or B is used, a CDL link may be determined to exist between a port (e.g., port 52) of the router and a port (e.g., port 62) of the optical equipment when the packet counts are the same for both ports within the same time interval.

While Method A may be suitable for many applications, Method B may be selected in the same or other applications. This is because periodic polling of Method A may be adversely affected, at times, by jitter that occurs during a readout process (e.g., transmission of packet count information to the cross-domain coordinator 10), but the accounting policy of Method B may be less affected under these circumstances. In some cases, jitter may cause the intervals used for packet counting at the ports on different sides of the link to be significantly longer or shorter (e.g., up to 5%) than the intended measurement interval. This may cause the numbers of counted packets to be inaccurate, which, in turn, may cause the cross-domain coordinator 10 to indicate that two ports are not connected, when they are actually connected by a cross-domain link. One or more embodiments described herein may compensate for these effects as described in greater detail below.

Figure 2:
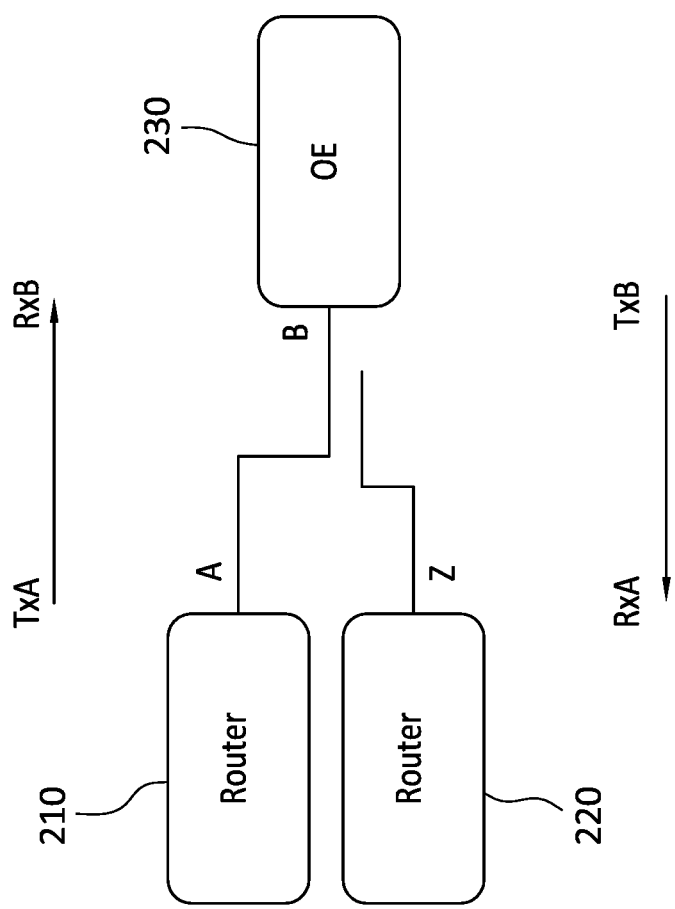
FIG. 2 illustrates an example of a cross-domain link.

FIG. 2 conceptually illustrates the case where the cross-domain coordinator is to determine whether a cross-domain link exists between a port A of first router 210 or port Z of a second router 220 and a port B of optical equipment 230. In this example, port A of router 210 is connected to port B of optical equipment 230 through a cross-domain link that is bidirectional.

Packets transmitted from router 210 to optical equipment 230 are labeled TxA→RxB, and packets transmitted from optical equipment 230 to router 210 are labeled TxB→RxA. Port Z of router 220 is connected to another destination port. In order to determine that the cross-domain link exists between ports A and B (and not Z and B), the cross-domain coordinator 10 may receive the following count information:

TxA: the number of transmitted packets at router 210

RxA: the number of received packets at the router 210

TxB: the number of transmitted packets at the optical device 230

RxB: the number of received packets at the optical device 230

When cross-domain coordinator 10 uses Method A to receive these packet counts, system 10 relies on the fact that a variation in the interval size affects the following differences: TxA−RxB and TxB−RxA. Corresponding patterns may be detected by comparing Equations (1) and (2) below. When the number of packets transmitted from port A equals the number of packets received by port B, the value of Equation (1) is zero. When the number of packets transmitted from port B equals the number of packets received by port A, the value of Equation (2) is zero. When Equation (1) and Equation (2) both equal zero, the cross-domain coordinator determines that port A and port B (and thus router 210 and optical device 230) are connected to each other through a cross-domain link.

$$(TxA-RxB)/(TxA+RxB) \qquad (1)$$

$$(TxB-RxA)/(TxB+RxA) \qquad (2)$$

The equality of Equations (1) and (2) applies in an ideal case. However, there are many situations where the ports of a router and optical device are connected to one another, but because of various factors Equations (1) and (2) do not both equal zero or are not equal to one another. Put differently, because of various factors the packet count at one port may be different from the packet count of another port, even though the two ports are connected to one another and the packets are counted in intervals of equal duration.

When cross-domain coordinator 10 uses Method B to receive packet counts, system 10 may determine whether two ports are connected across a cross-domain link based on a comparison of a first sum of TxA packet counts and RxB packet counts and a second sum of TxB packet counts and RxA packet counts. When ports A and B are connected through a same link, the difference between the first sum and the second sum will be substantially smaller than when ports A and B are not connected through a same link.

In one embodiment, the difference between the first sum and the second sum may be compared to a predetermined threshold value. If the difference is below the predetermined threshold value, then the cross-domain coordinator 10 may determine that port A is connected to port B. Conversely, if the difference is above the predetermined threshold value, the cross-domain coordinator 10 may determine that ports A and B are not connected to one another. Determining whether ports are connected using Method B may be more accurate than Method A in some cases. However, Method B may still be adversely affected by the same factors as Method A and/or by a different set of factors.

Factors which may cause packet counts at router and OE ports to deviate from the ideal case and be different (even though they are connected by a same cross-domain link) include packet losses and latency. Latency may exist, for example, when a packet is transmitted through one port in one interval (e.g., 8:00 to 8:15) and received at the other port of the cross-domain link in another interval (e.g., 8:15 to 8:30). While the embodiments described above may be somewhat effective in addressing these cases, the embodiments now further described may be more effective in addressing the following two factors for purposes of determining whether router and OE ports are connected. These embodiments may be effective for this purpose regardless of whether Method A or Method B is used for counting packets at the ports.

In one embodiment, the measurement intervals on routers and optical devices may be different. For example, routers may be polled every five minutes while optical devices are polled every 15 minutes. In this case, the intervals may be normalized before the algorithms are executed, e.g., compare the sum of three consecutive router values with one optical value.)

Factor One: Inexact-Sized Intervals One factor that may cause the packet counts to be different at the router and OE ports relates to inexact interval sizes. In this case, the same measurement interval applies to all equipment (potentially after normalization as described above), but the duration of the interval used to count packets flowing through the port at one side of the link may be slightly different from the duration of the interval used to count packets flowing through the port at the other side of the link. This difference may be caused by various effects including jitter in the management system. For example, the management system that collects the counts may be used for multiple purposes: infrastructure provisioning, service fulfillment, fault management and performance management. If the operator starts provisioning actions or if the system receives a large number of alarms, these other tasks may cause the performance management module to delay its actions, e.g., instead of reading counts at exactly 8:15, it may read counts at 8:16. The difference may also be caused by variations in queuing, as the management system may read performance data from hundreds of devices in some cases. Other effects involve latency, that causes jitter in the time the device receives the packet count read request. Additionally, there may be jitter in the device as well. If the device receives a packet count read request while simultaneously detecting alarms that require protection switching, the device may perform those tasks first before responding to the packet count read request.

Figure 3:
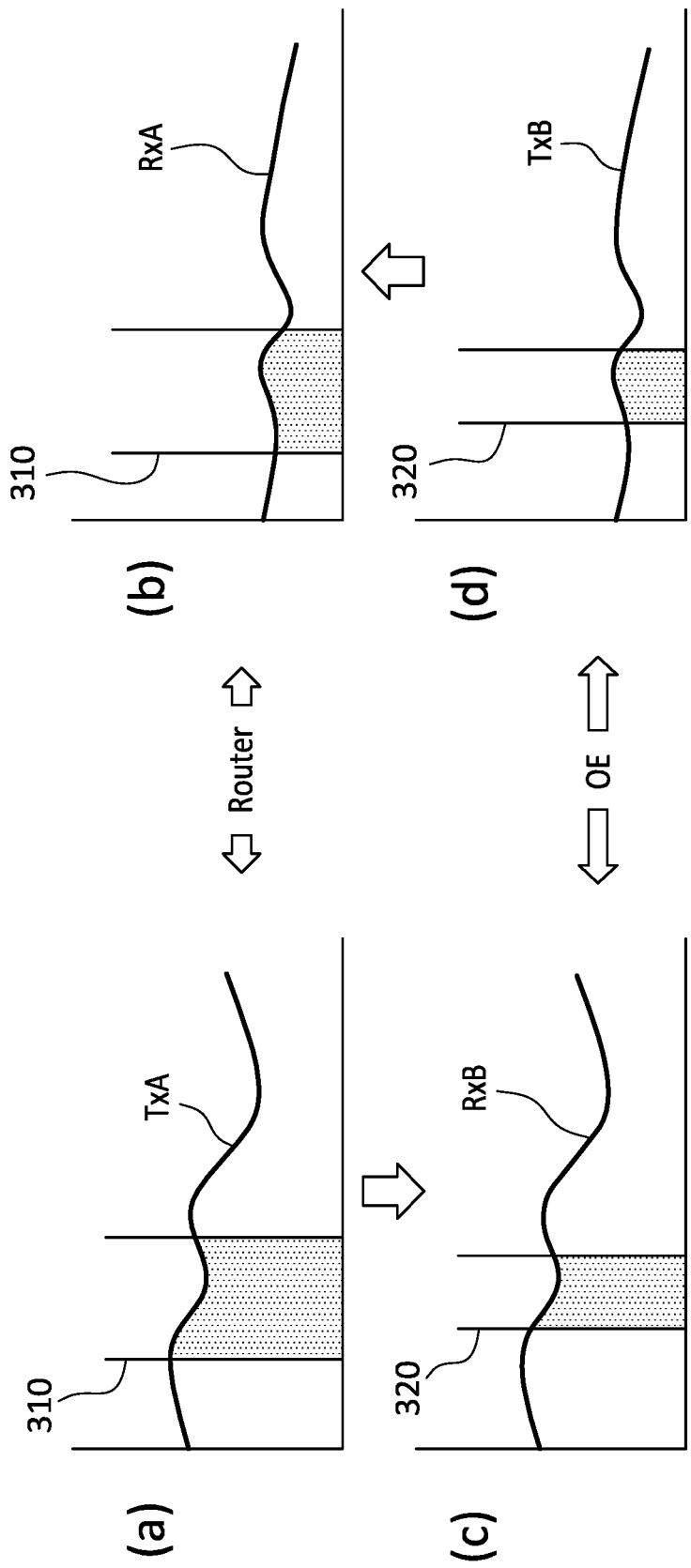
FIG. 3 illustrates examples of packet counts obtained for different size intervals implemented at router and optical equipment ports.

FIG. 3 illustrates how inexact-sized intervals generate different packet counts at router and OE ports connected by the same cross-domain link. As illustrated in FIG. 3, the router port transmits (TxA) and receives (RxA) packets during a first interval 310 in sections (a) and (b). The OE port transmits (TxB) and receives (RxB) packets during a second interval 320 in sections (c) and (d). The curves plotted in all four sections (a) to (d) correspond to the numbers of packets counted over time, including within respective ones of the first and second intervals.

In an ideal case, the size of the first interval 310 should be equal to the size of the second interval 320. That is, the number of transmitted packets counted at the port at one side of the link should equal the number of received packets counted at the port at an opposing side of the link. However, in an actual application the sizes of these intervals may be different, e.g., in this example first interval 310 is larger than the second interval 320.

More specifically, the difference in interval sizes skews the numbers of counted packets bidirectionally and proportionally. For example, when the interval size at the router port is larger than the interval size at the OE port, the difference value of TxA−RxB is positive, e.g., the number of packets transmitted from the router port is counted to be greater than the number of packets received at the OE port, even though in reality the number of transmitted and received packets in this case is the same. Conversely, the difference value of TxB−RxA is negative, e.g., the number of packets transmitted from the OE port is counted to be less than the number of packets received at the router port, even though in reality the number of transmitted and received packets in this case is the same.

Thus, the different interval sizes cause the numbers of transmitted and received packets counted at the router and OE ports to be different. This, in turn, may cause a cross-domain coordinator (operating without the compensation techniques of the embodiments described herein) to falsely indicate that a cross-domain link does not exist between the router and OE ports.

Compensation Algorithm for Inexact-Sized Intervals

In accordance with one embodiment, the disparity in counted packets caused by inexact interval sizes at opposing sides of a CDL link may be compensated, for purposes of discovering the link, using a statistical algorithm that is based on the function in Equation (3).

$$F(i)=((TxA-RxB)/(TxA+RxB))+((TxB-RxA)/(TxB+RxA)) \qquad (3)$$

where i corresponds to the interval at a corresponding one of the ports.

Because of variations in traffic flow, function F(i) may occasionally produce a larger value, even when the router and OE ports match. For non-matching ports, the function F(i) may occasionally result in relatively small numbers. In order to resolve these discrepancies and generate a more accurate result, a plurality of values may be computed using function F(i) over a predetermined number of intervals i, e.g., six intervals. The values may then be processed to generate an average value that is compared to one or more predetermined thresholds. The compensation algorithm (which may correspond to one of the programs stored in memory 20) may be mathematically expressed by Equations (4) and (5).

If Average [F(N), . . . ,F(N+5)]<1%, then ports match    (4)

If Average [F(N), . . . ,F(N+5)]>2%, then ports don't match    (5)

From Equations (4) and (5), it is evident that when the average value of six functional values F(N) to F(N+5) is less than a first predetermined threshold (e.g., 1%), then the cross-domain coordinator 10 determines that the router and OE ports match; that is, the router and OE ports are connected by a cross-domain link. When the average value is greater than the second predetermined threshold (e.g., 2%), then the cross-domain coordinator 10 determines that the router and OE ports do not match; that is, the router and OE ports are not connected by a cross-domain link.

If the average value is such that the comparison is inconclusive, the algorithm may be repeated based on the generation of another average value over the same or a different number of intervals. The comparison may be inconclusive, for example, when the average value is unusually large or small or otherwise considered to be out-of-range as defined by programming).

The functional values F(N) to F(N+5) may be calculated over consecutive intervals. In one embodiment, one or more of the intervals may be non-consecutive intervals. In the above example, the average value is calculated over six intervals. The number of intervals may be more or less than six in another embodiment. Also, the predetermined thresholds may be different percentages in another embodiment. In one embodiment, the average value may be compared to a single predetermined threshold and the determination may be made based on results of this comparison, e.g., whether the average value is above or below the single predetermined threshold.

Averaging the values generated by function F(i) over multiple intervals compensates for the difference in interval sizes at the router and OE ports and produces a result that clearly indicates (e.g., with substantial probability) whether the router and OE ports are connected by the same cross-domain link.

In one application, the cross-domain coordinator may be applied to a link application group (LAG). This may include the case where multiple physical ports of a router (which distribute traffic over parallel links) are treated as one virtual port. In such a LAG application, the traffic profiles (e.g., counted packets) on both ports may be similar. Even in this case, the algorithm in relation to Equations (3), (4), and (5), may produce a clear distinction between matching and non-matching ports.

Factor Two: Misaligned Intervals. Another factor that may cause the packet counts to be different at the router and OE ports relates to misaligned intervals. This may occur, for example, when the interval used to count packets at the port at one side of the link is different from the interval of the port used to count packets at port B. For example, misaligned intervals may exist when the intervals are shifted relative to one another. In this case, the intervals may have the same or different durations, but are shifted in time relative to one another. (When the intervals are misaligned and have different durations, the compensation algorithms for both of Factor One and Factor Two be applied and the better result chosen, for example, according to one or more predetermined rules. The difference durations may result from various conditions.

Figure 4:
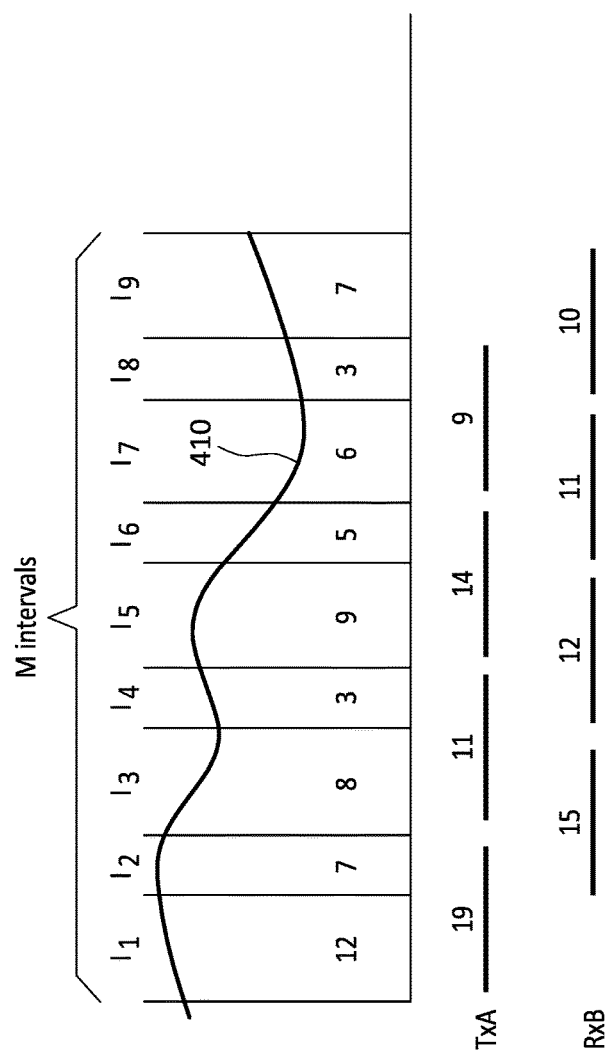
FIG. 4 illustrates an example of misaligned intervals used to obtain packet counts at router and optical equipment ports.

FIG. 4 illustrates an example of when the intervals used to count packets at the router port is misaligned with the intervals used to count packets at the OE port. In this case, the traffic flow may be the same (e.g., the number of transmitted packets equals the number of received packets), but nevertheless the counts TxA and RxB at respective ones of the ports different from one another.

In the example of FIG. 4, the case where the router transmits packets to the OE over a cross-domain link is illustrated. The packets are transmitted over a plurality of intervals M, where M>1. The intervals M may or may not be of equal duration. For purposes of this example, it is assumed that the M intervals are of equal duration. The actual numbers of packets transmitted between the router and OE ports correspond are shown in the intervals, e.g., 12 packets were transmitted and received over the cross-domain link in the first interval $I_1$, 7 packets were transmitted and received over the cross-domain link in the second interval $I_2$, and so on. The curve 410 tracks the actual numbers of the transmitted and received packets over the link.

The numbers of counted packets transmitted from the router port to the OE port are shown in the line corresponding to TxA. The numbers in this line represent the sum of non-overlapping pairs of adjacent intervals. (In one embodiment, each adjacent pair of intervals (or in this case, windows) may correspond to a single measurement interval.) For example, internal logic in the router counted a total of 19 transmitted packets in its first measurement interval (e.g., the first two intervals $I_1$ and $I_2$), a total of 11 transmitted packets were counted in the next measurement interval (e.g., two intervals $I_3$ and $I_4$), a total of 14 transmitted packets were counted in the next two intervals $I_5$ and $I_6$, and a total of 9 transmitted packets were counted in the next two intervals $I_7$ and $I_8$.

The intervals that are used to count the packets received at the OE port are shifted in time relative to the intervals used to count the packets transmitted from the router. In this example, there is a shift of one interval, but there may be a different shift in time in another embodiment. Because of the intervals used to count the packets received at the OE are shifted relative to the intervals used to count the packets transmitted at the router, the numbers of counted packets (RxB) received at the OE port vary from the counted number of transmitted packets TxA. As shown in the line corresponding to RxA, internal logic of the OE counted a total of 15 packets in its first measurement interval (e.g., its first two intervals, which because of the shift corresponds to intervals $I_2$ and $I_3$), a total of 12 received packets were counted in the next measurement interval (e.g., next two intervals $I_4$ and $I_5$), a total of 11 received packets were counted in the next two intervals $I_6$ and $I_7$, and a total of 10 received packets were counted in the next two intervals $I_8$ and $I_9$.

Compensation Algorithm for Misaligned Intervals

One or more embodiments described herein may be used to compensate for the shifted, misaligned intervals in order to accurately determine that a cross-domain link exists between the router and OE ports. The algorithm is based initially on recognizing that the sum of the TxA counts and RxA counts converge to be similar over longer periods of time, e.g., over longer periods. In one embodiment, the period may correspond to the M intervals. Thus, as M increases, the relative difference between the sum of TxA and the sum of RxA tends to converge to similar values. This may be explained as follows.

Figure 5:
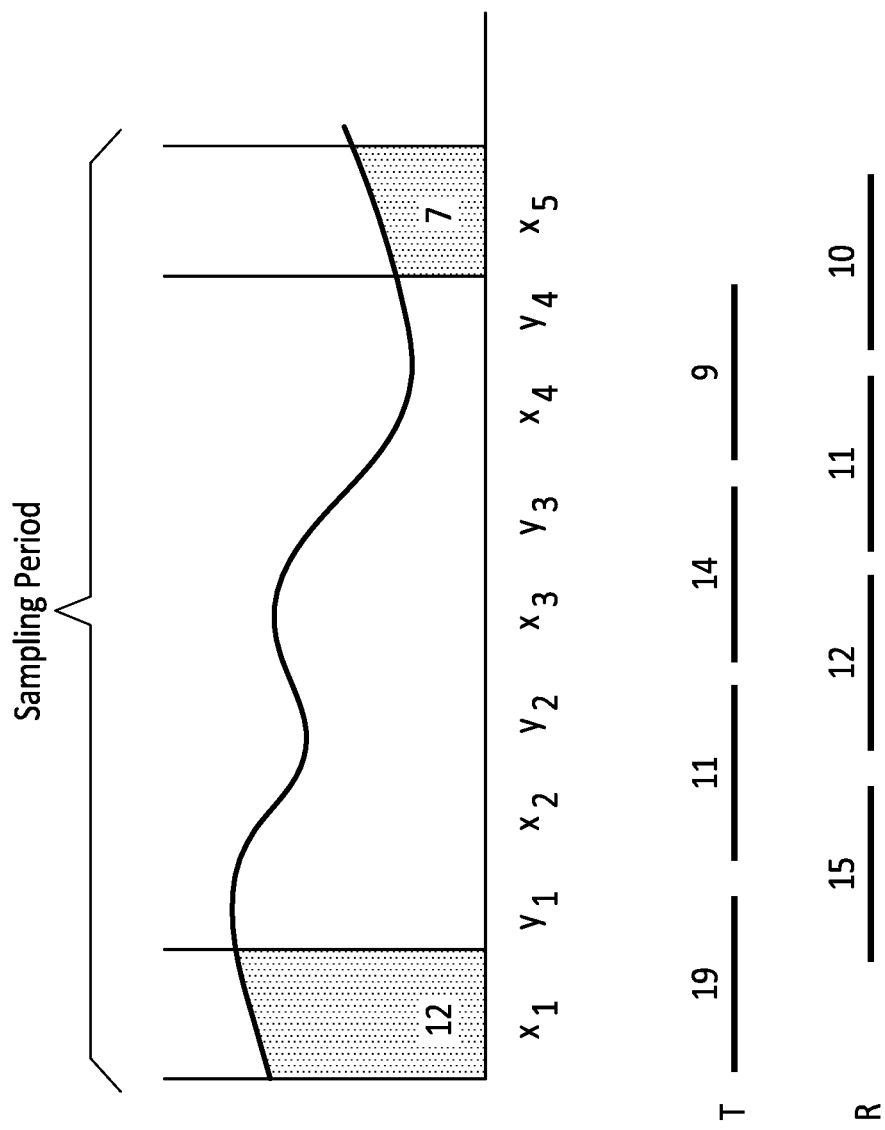
FIG. 5 illustrates a plurality of intervals including windows for which packet counts are obtained using the misaligned intervals.

FIG. 5 illustrates the plot of FIG. 4 where each interval is defined as including $X_i$ windows and $Y_i$ windows, where X+Y form one measurement interval. Y(k) is the intersection of the $K^{th}$ measurement interval at the transmit side and the $k^{th}$ measurement interval at the receive side. X(k) is the intersection of the $k^{th}$ measurement interval at the transmit side and the $(k-1)^{th}$ measurement interval at the receive side. From this follows that the first measurement interval at the transmit side is X(1)+Y(1).

When defined in this manner, logic at the router port counts transmitted packets in the following four (TxA) intervals in this example: interval one includes windows $X_1$ and $Y_1$, interval two includes windows $X_2$ and $Y_2$, interval three includes windows $X_3$ and $Y_3$, and interval four includes windows $X_4$ and $Y_4$. Logic at the OE port counts received packets in the following four (RxB) intervals in this example: interval one includes windows $Y_1$ and $X_2$, interval two includes windows $Y_2$ and $X_3$, interval three includes windows $Y_3$ and $X_4$, and interval four includes windows $Y_4$ and $X_5$. The durations of the X and Y windows may be the same or different.

When the intervals are defined in the manner illustrated in FIG. 5, the intervals used to count packets at the OE port may be said to be shifted by some fraction (e.g., one-half) of an interval relative to the intervals used to count packets at the router. In this case, the intervals at the router and the intervals at the OE partially overlap. Given this definition and arrangement of intervals, a compensation algorithm may be performed which, in the present embodiment, initially involves calculating a sum (SumTxA) of packet counts at the transmitter port over a plurality of intervals i of a period and a sum (SumRxB) of packet counts at the receiver port over the plurality of intervals i of the period. The T and R count values may be expressed in Equations (6) and (7) for a period of 4 intervals.

$$\text{Sum}TxA = \Sigma_{i=1}^{4}(x_i + y_i) \quad (6)$$

$$\text{Sum}RxB = \Sigma_{i=1}^{4}(y_i + x_{i+1}) \quad (7)$$

While the number of intervals is 4 in this embodiment, the number of intervals used to compute the SumTxA and SumRxB values may be different in another embodiment. In the above equations, $X_i + Y_i$ represents a TxA measurement interval, while $Y_i + X_{i+1}$ represents an RxB measurement interval. The sizes of x and y may differ.

Once SumTxA and SumRxB have been calculated, a difference value D may be calculated by Equation (8) based on the T and R count values. In the example where the sums are calculated over 4 intervals, $$D = SumTxA - SumRxB \quad (8)$$
$$= X_1 - X_5$$

From Equation (8), it is apparent that the difference in count values of the X window in the first interval and the X window in the last interval in the period represents the error in count values produced at the router and OE ports as a result of the shifted intervals.

Different sizes and/or arrangements of the X and Y windows may produce different difference values D. In some cases, it may be possible to derive the relative sizes (e.g., durations) of the windows (and thus the intervals) based on information provided by the router, OE, and/or other network equipment or the cross-domain coordinator. For example, information retrieved from the router may indicate that 15-minute intervals are to be used, where the first interval for TxA is 8:00 to 8:15. Information retrieved from the OE may indicate that 15-minute intervals are to be used, where the first interval for RxB is 8:10-8:25. In that case, the X window duration is 10 minutes and Y window duration is 5 minutes.

While the interval information may be known, the compensation algorithm in the present embodiment may assume that the sizes and/or shifts of the overlapping intervals are not known and instead compares the absolute value of SumTxA(k)−SumRxB(k) with the absolute value of SumRxB(k)−SumTxA(k+1), where SumTxA(k) is the sum of N consecutive TxA measurement values starting at interval k.

Figure 6:
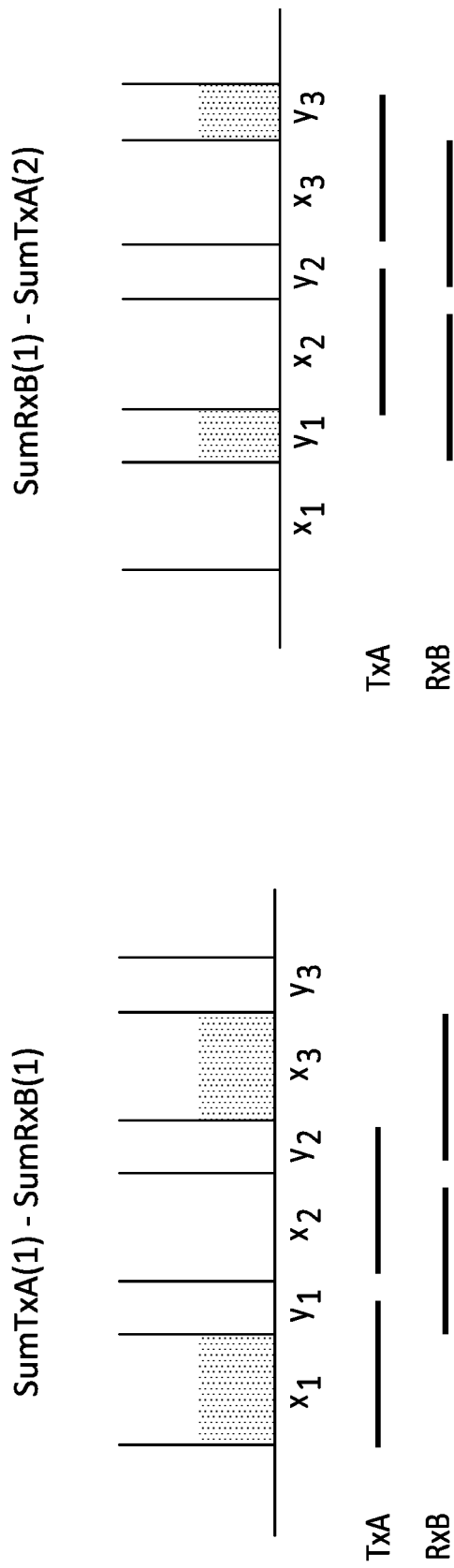
FIGS. 6A and 6B illustrate different types of misaligned intervals.
Figure 7:
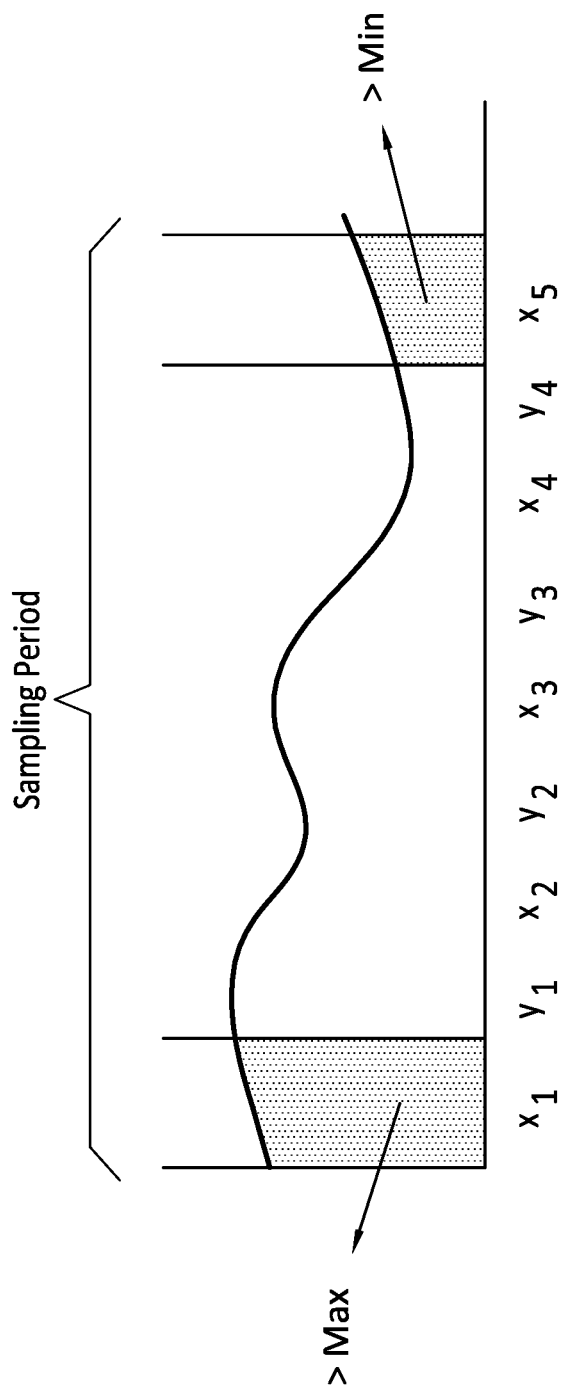
FIG. 7 illustrates an example of values used in discovering a cross-domain link.

FIGS. 6A and 6B illustrate examples of how the difference between X and Y windows affects the difference between SumTxA and SumRxB values. In these examples, the duration of the $Y_i$ windows is less than the duration of the $X_i$ windows. As a consequence, the packet counts during the $Y_i$ windows are generally smaller than the packet counts during the $X_i$ windows. The shaded portions in FIG. 6A illustrate that SumTxA(1)−SumRxB(1)=$X_1$−$X_3$. The shaded portions in FIG. 6B illustrate that SumRxB(1)−SumTxA(2)=$Y_1$−$Y_3$. In this example, the number of intervals over which the sums are calculated is 2.

Generalizing FIG. 6A, it is easy to prove that, when calculated over N intervals, and when TxA and RxB measure the same traffic flow, $$\text{Sum}TxA(k) - \text{Sum}RxB(k) = X_k - X_{k+N} \quad (9a)$$

Generalizing FIG. 6B, it is easy to prove that, when calculated over N intervals, and when TxA and RxB measure the same traffic flow, $$\text{Sum}RxB(k) - \text{Sum}TxA(k+1) = Y_k - Y_{k+N} \quad (9b)$$

Equations 9a and 9b show that the absolute values of (SumTxA(k)−SumRxB(k)) and (SumRxB(k)−SumTxA(k+1)) are generally small compared to the sums themselves, SumTxA(k) and SumRxB(k), especially for larger values of N. This is only true when the measurements apply to the same traffic flow, i.e. when the TxA and RxB count values are collected from a router port and an OE port that are connected. When TxA and RxB count values are collected from a router port and an OE port that are not connected, the absolute values of (SumTxA(k)−SumRxB(k)) and (SumRxB(k)−SumTxA(k+1)) are generally much larger.

After (SumTxA(k)−SumRxB(k)) and (SumRxB(k−SumTxA(k+1)) are computed, the compensation algorithm continues by calculating MaxTxA(k), which is the maximum of the TxA count values over N intervals in the period starting with interval k. The maximums MaxRxA(k), MaxTxB(k) and MaxRxB(k) may be calculated in a similar manner. In addition, the compensation algorithm calculates MinTxA(k), which is the minimum of the TxA count values over N intervals in the period starting with interval k. The minimums MinRxA(k), MinTxB(k) and MinRxB(k) may be calculated in a manner similar to MinTxA(k).

Once the maximum and minimum values are calculated, the compensation algorithm performs the following operations to determine whether the router port and OE port are connected by a cross-domain link. First, a determination is made as to whether to use the first difference value |SumRxB(k)−SumTxA(k+1)| or the second difference value |SumTxA(k)−SumRxB(k)| as previously calculated. (The vertical bars denote absolute values.) Then, the smaller of the first difference value or the second difference value is selected.

Subsequently, the compensation algorithm determines whether the selected difference value (e.g., |SumTxA(k)−SumRxA(k)|) is sufficiently small to warrant a conclusion that the router port and OE port are connected. This may be accomplished by comparing the selected difference value to a reference value that is based on the maximum and minimum values over the N intervals of the period and then performing a check based on the comparison. For example, if the selected difference value (SumTxA(k)−SumRxB(k))>0, then check whether (SumTxA(k)−SumRxB(k))<(1+δ)*(MaxTxA(k)−MinRxB(k)). This inequality may be referred to as Equation 10a. If SumTxA(k)−SumRxB(k)<0, then check whether (SumRxB(k)−SumTxA(k))<(1+δ)*((MaxRxB(k)−MinTxA(k)). This inequality may be referred to as Equation 10b. Similarly, if the selected difference value is |SumRxB(k)−SumTxA(k+1)|, then, if SumRxB(k)−SumTxA(k+1)>0, check whether (SumRxB(k)−SumTxA(k+1))<(1+δ)*((MaxRxB(k)−MinTxA(k+1)). This inequality may be referred to as Equation 10c. If SumRxB(k)−SumTxA(k+1)<0, then check whether SumTxA(k+1)−SumRxB(k))<(1+δ)*(MaxTxA(k+1)−MinRxB(k)). This inequality may be referred to as Equation 10d. These values are calculated for one direction of the bidirectional link.

The value of δ may be a predetermined fixed value determined as a function of traffic distribution. For example, at any point in time, the amount of traffic may be considered as a stochastic variable that captures its difference from the average. For example, assume that the packet count between 8:00 and 8:15 is 60. If the traffic flow was uniformly distributed, the count between 8:00 and 8:05 would be 20 and the count between 8:05 and 8:15 would be 40. However, traffic fluctuates, and the values could be 25 and 35. If traffic is even more volatile, the values could be 30 and 30 (or 5 and 55). If SumTxA(k)−SumRxB(k)>0, then, in almost all cases, (SumTxA(k)−SumRxB(k))<(MaxTxA(k)−MinRxB(k)). However, the volatility of the traffic distribution may cause (SumTxA(k)−SumRxA(k)) to exceed (MaxTxA(k)−MinRxB(k)) by a little bit. This little bit is captured by a delta. For regular Internet traffic, δ may be determined by looking at a sufficiently large number of sample flows. When a sufficient number of data points is collected, the value of δ may be able to be confidently determined.

In one embodiment, the compensation algorithm may perform an analogous set of operations for the reverse direction of the bidirectional link.

In one embodiment, the comparison and checking operations—10a, 10b, 10c and 10d—may be performed based on the sums of TxA, RxA, TxB and RxB over N consecutive measurement intervals and the Max and Min values during those same N measurement intervals. Ideally, this would be conclusive. However, sometimes non-matching ports may show small results that suggest that they match. In order to impart a greater level of certainty, calculation of the sums may be performed multiple (M) times, either consecutively or on a non-consecutive basis. For example, let N be 10. The first calculation may be performed over intervals 1, ..., 10, the second calculation may be performed over intervals 2, ..., 11, the third calculation may be performed over intervals 3, ..., 12, etc. In another embodiment, the calculations may be performed over intervals 1, ..., 10 and then intervals 5, ..., 14 and intervals 13, ..., 22, and so on, up to M times.

In one embodiment, the compensation algorithm may use a selection criterion based on the number of measurements for which Equations 10a to 10d are true. For example, if for all M measurements the comparison is true then it determines that the router and OE ports match; that is, the router and OE ports are connected by a cross-domain link. If 2 or more of the Equations 10a to 10d are not true, a determination is made that the ports do not match. If exactly one of the Equations 10a to 10d is not true, the test may be determined to be inconclusive and can, for example, execute the same comparisons on a different set of measurement counts retrieved from the same ports. These operations may be performed, for example, by the cross-domain coordinator.

In one embodiment, the compensation algorithm may calculate ratios, e.g., the ratio that relates to the comparison of Equation 10a is ((SumTxA(k)−SumRxB(k))/(1+δ)*(MaxTxA(k)−MinRxB(k))). Then, an average may be taken over M comparisons. If the average of ratios is below a certain threshold, a determination may be made that the ports match. If the average of ratios is above another threshold, a determination may be made that the ports do not match. If the average is between the two thresholds it may determine that the test is inconclusive and, for example, execute the same comparisons on a different set of measurement counts retrieved from the same ports. These operations may be performed, for example, by the cross-domain coordinator.

Preliminary research based on real-world traffic flows indicates that execution of this algorithm with N=6, M=8 and δ=0.1 may be sufficient in some cases in order to determine whether the ports match, e.g., whether the router and OE ports are connected. The values of N, M and δ may be different in other embodiments. The algorithm also works to distinguish between matching ports and non-matching ports in case of a LAG.

Comparing SumTxA, SumRxB, MaxTxA and MaxRxB as in Equations 10a, 10b, 10c and 10d works for any traffic flow. In one embodiment, the compensation algorithm may use a different (smaller) reference value based on characteristics of the measurement count sequence. For example, the cross-domain coordinator may distinguish between growing flows, where the later measurement counts are larger than the earlier measurement counts, declining flows, where the later measurement counts are smaller than the earlier measurement counts, and steady flows, where the early measurement count values are of the same order as the later measurement count values. The cross-domain coordinator may also characterize the volatility of the traffic flow by examining the distribution of measurement counts. Based on these assessments it may decide that a smaller reference value applies. Using a smaller reference value decreases the risk of finding false positives, e.g., ports that are not connected but that are determined by the algorithm to be matching.

Figure 8:
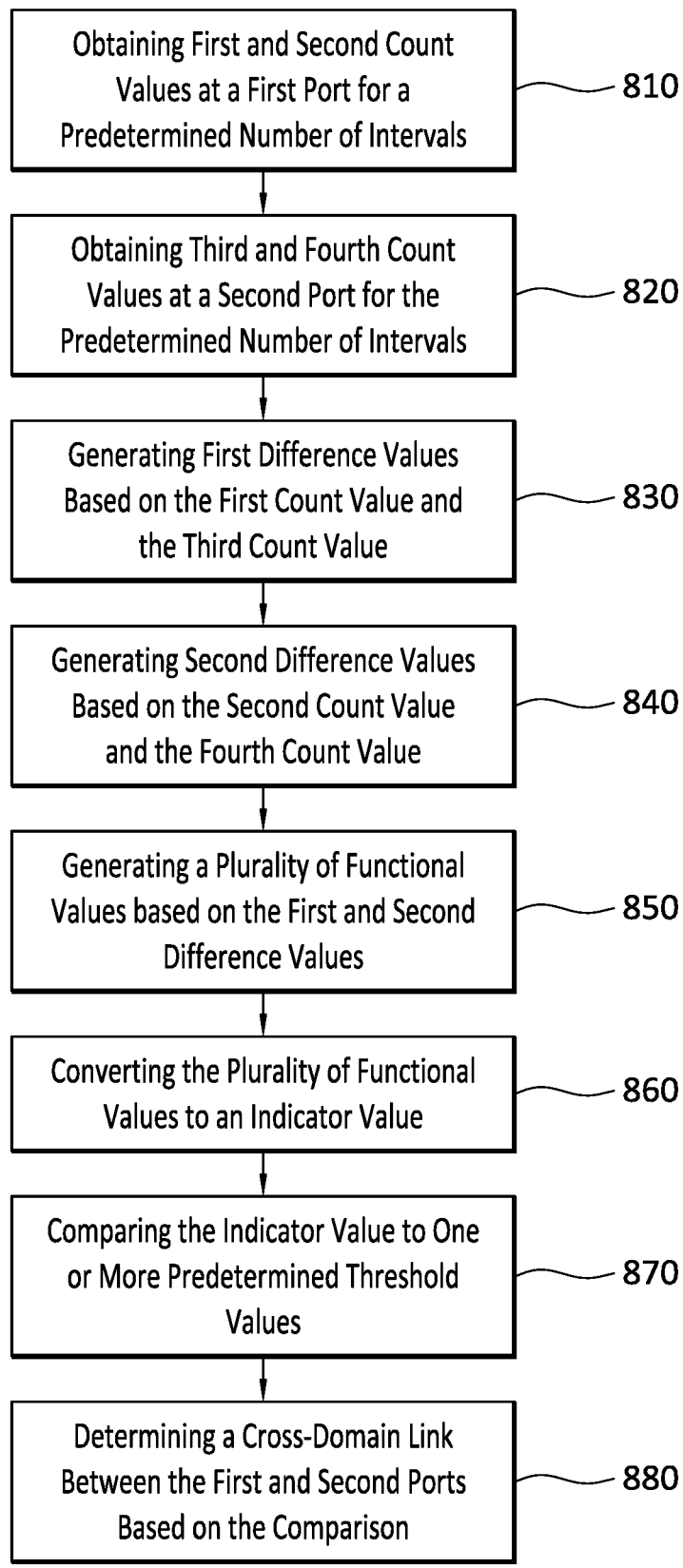
FIG. 8 illustrates an embodiment of a method for discovering a cross-domain link when different size intervals are used to count packets at the connected ports.

FIG. 8 illustrates an embodiment of a method for discovering a cross-domain link between a port of a router and a port of optical equipment in a communications network. In this embodiment, the cross-domain link is discovered even though intervals used to determine traffic flow at the router and optical equipment ports may vary slightly, for example, as previously described. Thus, the present embodiment may be said to compensate for inconsistences caused by the inexact-sized intervals, which inconsistencies would prevent discovery of the cross-domain link using other methods. The method embodiments may be performed, for example, by the system embodiments disclosed herein or a different system.

At 810, the method includes obtaining a first count value and a second count value at a first port. The first and second count values may be determined over a predetermined number of intervals, e.g., six intervals. The first count value may correspond to the number of counted packets transmitted at the first port the second count value may correspond to the number of counted packets received at the first port over the predetermined number of intervals. For example, the first count value may be TxA and the second count value may be RxA, as previously discussed. The first port may be a port of a router At 820, a third count value and a fourth count value are obtained at a second port. The third and fourth count values may be determined over the predetermined number of intervals. The third count value may correspond to the number of counted packets transmitted at the second port and the fourth count value may correspond to the number of counted packets received at the second port. For example, the third count value may be RxB and the fourth count value maybe TxB, as previously indicated. The second port may be an OE port. The count values obtained in operations 810 and 820 may be computed by the router and optical equipment and then sent over respective network paths to the cross-domain coordinator, or the count values may be calculated by the cross-domain coordinator based on information received from the router and optical equipment.

At 830, a first difference value is generated based on the first and third count values. For example, the first difference value may correspond to TxA−RxB.

At 840, a second difference value is generated based on the second and fourth count values. For example, the second difference value may correspond to TxB−RxA.

At 850, a plurality of functional values is generated based on the first difference value and the second difference value. The functional values may be those set forth, for example, in Equation (3) previously discussed.

At 860, the plurality of functional values is converted into an indicator value. The indicator value may be generated, for example, by performing a statistical operation on the plurality of functional values. One example of a statistical operation is taking an average of the functional values.

At 870, the indicator value is compared to one or more predetermined thresholds. The one or more predetermined thresholds may be determined, for example, based on network data, system tolerances, performance requirements, and/or other criteria. In one embodiment, the predetermined thresholds may be expressed as the percentages set forth in Equations (4) and (5).

At 880, the existence of a cross-domain link between the first and second ports may be discovered based on the comparison performed in operation 870.

Figure 9:
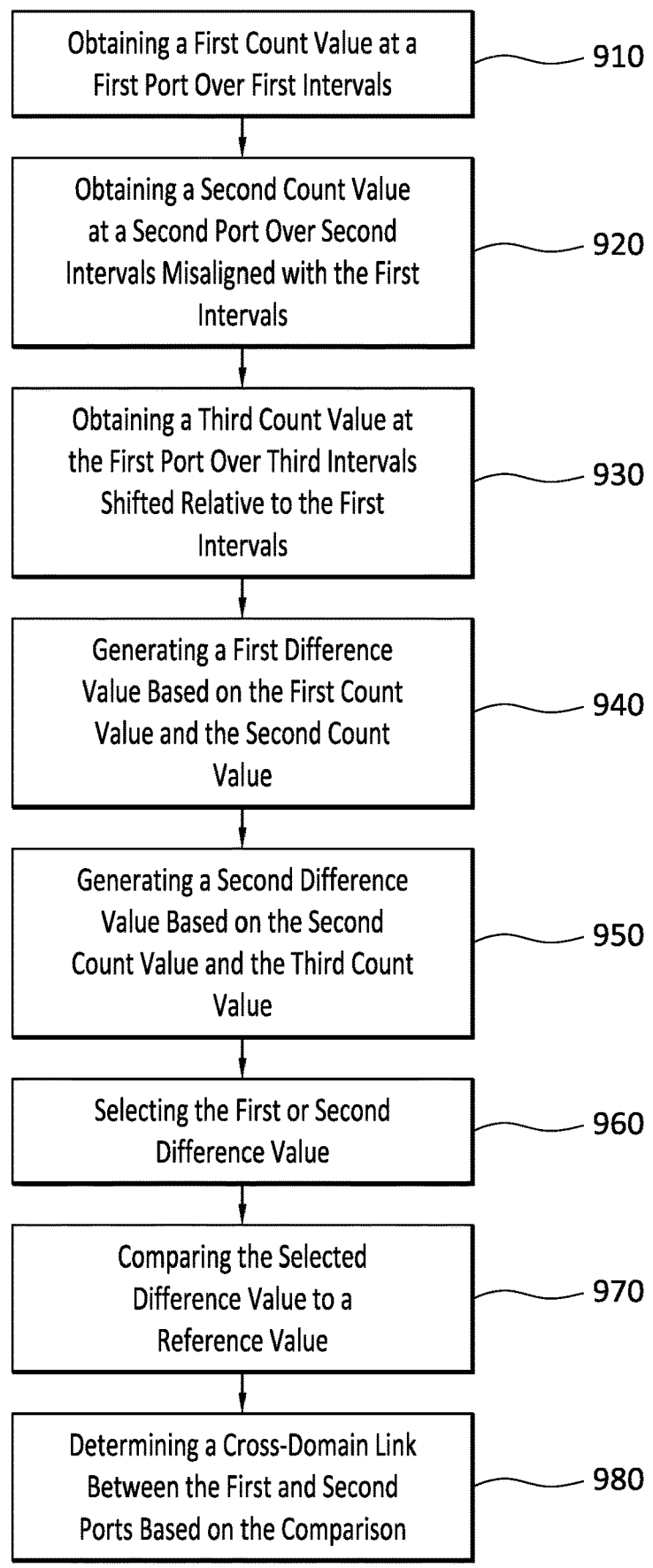
FIG. 9 illustrates an embodiment of a method for discovering a cross-domain link when misaligned intervals are used to count packets at the connected ports.

FIG. 9 illustrates an embodiment of a method for discovering a cross-domain link between a port of a router and a port of optical equipment in a communications network. In this embodiment, the cross-domain link is discovered even though intervals used to determine traffic flow the router and optical equipment ports are misaligned, for example, as previously described. Thus, the present embodiment may be said to compensate for inconsistences caused by the misaligned intervals, which inconsistencies would prevent discovery of cross-domain link using other methods. The method embodiments may be performed, for example, by the system embodiments disclosed herein or a different system.

At 910, the method includes obtaining a first count value at a first port over a number of first intervals. The first port may be the router port and the first count value may correspond, for example, to the T count value as previously discussed, e.g., SumTxA(k), for the first intervals as illustrated, for example, in FIGS. 4, 5, and 6A.

At 920, a second count value at a second port is obtained over a number of second intervals. The second port may be a port on an OE and the second count value may correspond, for example, to the sum of counted packets SumRxB(k), as previously discussed. The second intervals are included in a same period as the first intervals and are misaligned relative to the first intervals. For example, when each of the intervals include X and Y windows as previously discussed, the second intervals may be misaligned from the first intervals by one of the X or Y windows, e.g., by one half of an interval.

At 930, a third count value at the first port is obtained over a number of third intervals. The third intervals are included in the same period and may be shifted relative to the first intervals by one interval i. Thus, for example, the third count value may correspond to the sum of counted packets SumTxA(k+1), as previously discussed. The count values obtained in operations 910 and 930 may be computed by the router and optical equipment and then sent over respective network paths to the cross-domain coordinator, or the count values may be calculated by the cross-domain coordinator based on information received from the router and optical equipment.

At 940, a first difference value is generated based on the first count value and the second count value. The first difference value may correspond, for example, to the difference |SumTxA(k)−SumRxB(k)|, as previously discussed.

At 950, a second difference value is generated based on the second count value and the third count value. The second difference value may correspond, for example, to the difference |SumRxB(k)−SumTxA(k+1)|, as previously discussed. As used herein, the vertical bars may indicate absolute values in some embodiments.

At 960, the first difference value or the second difference value is selected based on one or more predetermined criteria. For example, the smaller of the first difference value or the second difference value may be selected.

At 970, the selected difference value is compared to a reference value. The reference value may be, for example, the term $(1+\delta)*(MaxTxA(k)-MinRxB(k))$ or the term $(1+\delta)*((MaxRxB(k)-MinTxA(k+1))$, for example, based on whether the selected difference value is a positive number or a negative number.

At 980, the existence of a cross-domain link between the first port and the second port is determined based on the comparison in operation 970.

In one embodiment, the cross-domain coordinator 10 may apply both compensation algorithms, for example, when the intervals at the router and OE ports are of different sizes and are misaligned. In this case, the cross-domain coordinator 10 may determine (e.g., based on a predetermined rule or programming criteria) whether to accept the result obtained from the compensation algorithm used for inexact-sized intervals or the result obtained from compensation algorithm used for misaligned intervals. The predetermined rule, for example, may be one which discovers the cross-domain link only when the results of both algorithms agree. In one embodiment, an operator may make the determination of which compensation algorithm to apply.

Figure 10:
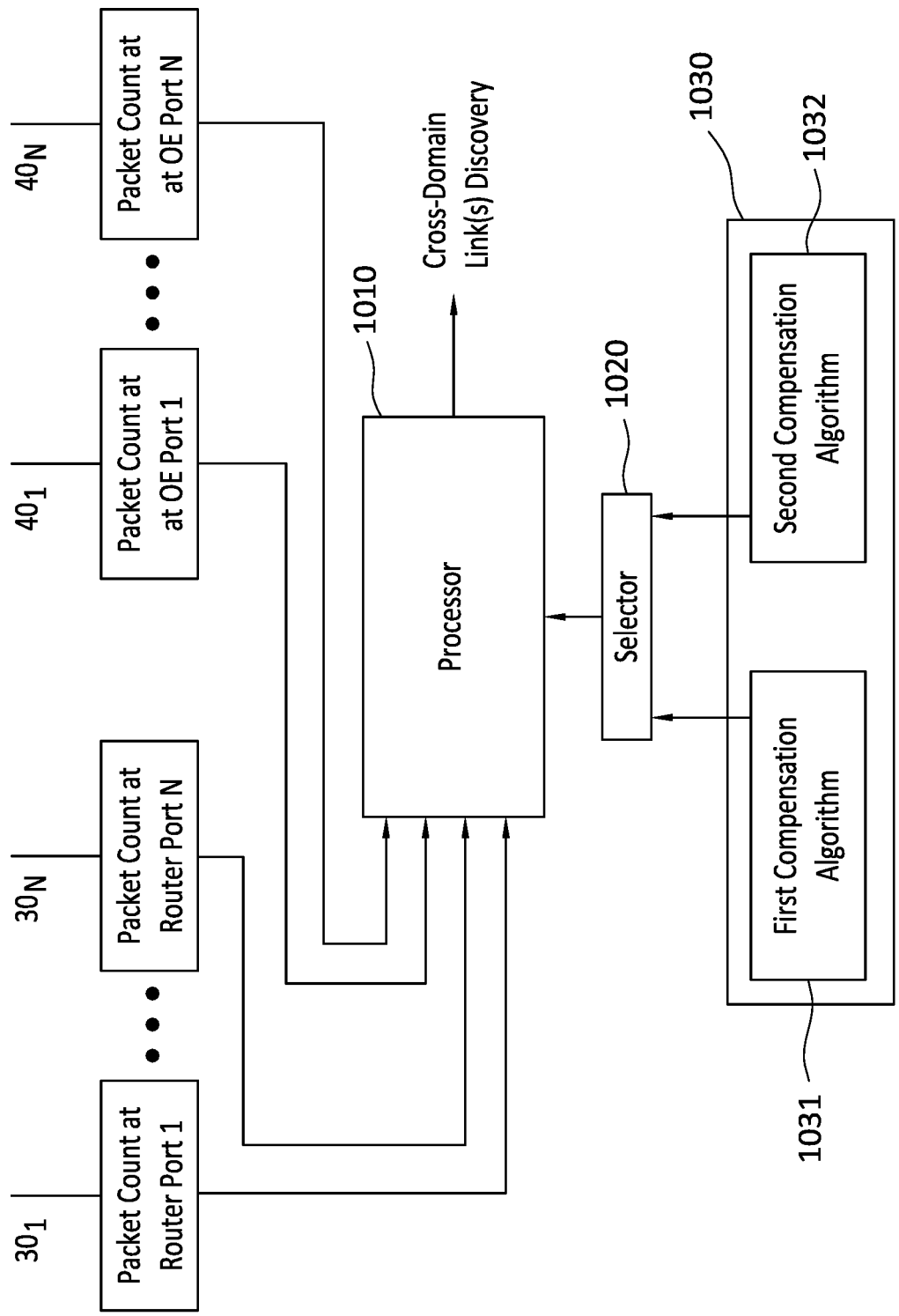
FIG. 10 illustrates an embodiment of a cross-domain coordinator.

FIG. 10 illustrates an embodiment of a cross-domain coordinator, which, for example, may correspond to the cross-domain coordinator 10 of FIG. 1. Referring to FIG. 10, the cross-domain coordinator includes a processor 1010, a selector 1020, and a memory 1030. The processor 1010 may implement one or both of the first and second compensation algorithms 1031 and 1032 stored in memory 1030, as described herein. The selector 1020 may select which algorithm is to be implemented by the processor, for example, based on programming based on one or more predetermined requirements and/or input from an operator. The selector 1020 may be considered as an optional feature and may be omitted in some embodiments.

In operation, the processor implements the compensation algorithms based on packet count information received through the router and OE. When the router includes multiple ports, the processor 1010 may receive packet count information for respective ports $30_1$ to $30_N$ of the router. In one embodiment, the processor 1010 may receive packet count information for respective ports of a device different from a router. For example, a router may be dual-homed onto two OEs, with one of its ports is connected to OE1 and another to OE2. To identify matching ports in this case, all ports on all routers (at least the ones facing OEs) may be considered at a particular location, along with all ports on all OEs (at least the ones facing routers) in that same location. Limiting the process to equipment that resides in the same location may not be necessary. For example, one or more embodiments may be applied across all traffic counts (e.g., packet or byte counts) across the network. By looking at all counts, the algorithm could enable an operator to validate the entire end-to-end path from router to router.

Figure 11:
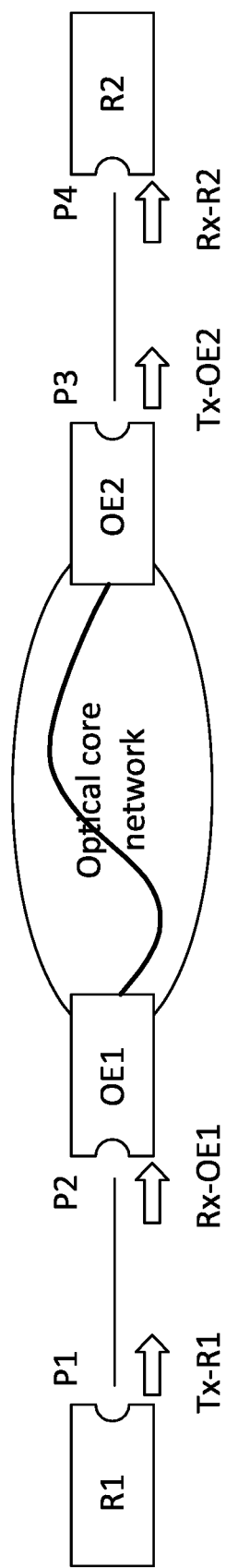
FIG. 11 illustrates another embodiment of a cross-domain coordinator.

FIG. 11 illustrates an embodiment of a method that applies across all traffic counts across a network, as indicated above. In this embodiment, the methods and processes described herein may be applied to determine that ports P1, P2, P3 and P4 are all matching ports. For example, the algorithm may be applied to any two of the four ports to identify that the ports match. Some adaptations may be performed in this case, e.g. instead of comparing Tx–R1 with Rx–OE1, Tx–R1 may be compared with Tx–OE2 to determine that the ports match.

When the OE has multiple ports, the processor 1010 may receive packet count information for respective ports $40_1$ to $40_N$. The compensation algorithm(s) are implemented based on these packet counts, as previously described. The first and second compensation algorithms include instructions stored in memory 1030 for causing the processor 1030 to discover cross-domain links as described in accordance with one or more embodiments. The memory 1030 may be a non-transitory computer-readable medium for storing these instructions and/or other data. For example, in one embodiment, the memory 1030 may also store the packet count information for the processor 1030 or this count information may be stored in a database.

The methods, processes, and/or operations described herein may be performed by code or instructions to be executed by a computer, processor, controller, or other signal processing device. The code or instructions may be stored in the non-transitory computer-readable medium as previously described in accordance with one or more embodiments. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The processors, algorithms, packet counters, routers, optical equipment, and other signal generating and signal processing features of the embodiments disclosed herein may be implemented in logic which, for example, may include hardware, software, or both. When implemented at least partially in hardware, the processors, algorithms, packet counters, routers, optical equipment, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, algorithms, packet counters, routers, optical equipment, and other signal generating and signal processing features may include, for example, a memory or other storage device for storing code or instructions to be executed, for example, by a computer, processor, microprocessor, controller, or other signal processing device.

The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method for managing information in a network, comprising:
   obtaining a first count value at a first port over a period;
   obtaining a second count value at a second port over the period;
   generating a first difference value based on the first and second count values;
   comparing the first difference value to a first reference value for the period; and
   determining a cross-domain link between the first and second ports based on the first difference value, wherein the first count value is based on a sum of packets counted at the first port during first intervals and the second count value is based on a sum of packets counted at the second port during second intervals and wherein the second intervals are misaligned relative to the first intervals in the period.

2. The method of claim 1, wherein the sum of packets counted at the first port corresponds to packets transmitted at the first port and the sum of packets counted at the second port corresponds packets received at the second port.

3. The method of claim 1, wherein the first intervals partially overlap the second intervals within the period.

4. The method of claim 3, wherein:
   each of the intervals includes a first window and a second window, and
   the second intervals are shifted relative to the first intervals by the first window or the second window.

5. The method of claim 1, wherein the first reference value is based on:
   a difference between a maximum number of counted packets for the first intervals and a minimum number of counted packets over the second intervals, or
   a difference between a maximum number of counted packets for the second intervals and a minimum number of counted packets over the first intervals.

6. The method of claim 1, further comprising:
   obtaining a third count value corresponding to a sum of packets counted at the first port over third intervals of the period, the third intervals shifted relative to the first intervals,
   generating a second difference value based on the second and third count values, and
   selecting the first difference value over the second difference value.

7. The method of claim 6, wherein the third intervals are shifted by one interval relative to the first intervals.

8. The method of claim 6, wherein the first difference value is smaller than the second difference value.

9. The method of claim 1, wherein the first port is a router port and the second port is a port of optical equipment.

10. A method for managing information in a network, comprising:
    obtaining count values at a first port over a plurality of first intervals;
    obtaining count values at a second port over a plurality of second intervals;
    generating difference values based on the count values at the first and second ports;
    generating an indicator value based on the difference values; and
    determining a cross-domain link between the first port and the second port based on the indicator value based on the difference values, wherein the first intervals and the second intervals have different durations and are included in a same period.

11. The method of claim 10, wherein:
    the count values at the first port include a first count value for packets transmitted at the first port and a second count value for packets received at the first port, and
    the count values at the second port include a third count value for packets received at the second port and a fourth count value for packets transmitted at the second port.

12. The method of claim 11, wherein the difference values include:
    first difference values generated based on the first and third count values, and
    second difference values generated based on the second and fourth count values.

13. The method of claim 12, further comprising:
    generating a plurality of functional values based on the first and second difference values, wherein the indicator value is generated based on the plurality of functional values.

14. The method of claim 13, further comprising:
    comparing the indicator value to at least one predetermined threshold,
    wherein the cross-domain link is determined based on a result of the comparison.

15. The method of claim 13, wherein the plurality of functional values are generated based on the following equation:

$$F(i)=((TxA-RxB)/(TxA+RxB))+((TxB-RxA)/(TxB+RxA)),$$

where TxA corresponds to the first count value for packets transmitted at the first port, RxB corresponds to the third count value for packets received at the second port, TxB corresponds to the fourth count value for packets transmitted at the second port, and RxA corresponds to the second count value for packets received at the first port.

16. The method of claim 10, wherein the first port is a router port and the second port is a port of optical equipment.

17. The method of claim 11, further comprising:
   obtaining the first, second, third, and fourth count values based on periodic polling of network devices respectively including the first and second ports.

18. The method of claim 10, wherein each of the plurality of first intervals and the plurality of second intervals is 6 or more intervals.

* * * * *